(12) United States Patent
Huang et al.

(10) Patent No.: US 8,532,103 B2
(45) Date of Patent: Sep. 10, 2013

(54) RESOURCE INITIALIZATION METHOD AND SYSTEM, AND NETWORK ACCESS SERVER

(75) Inventors: Fuqing Huang, Shenzhen (CN); Yong Huang, Shenzhen (CN); Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 13/091,718

(22) Filed: Apr. 21, 2011

(65) Prior Publication Data

US 2011/0200043 A1  Aug. 18, 2011

Related U.S. Application Data

(63) Continuation of application No. PCT/CN2009/073205, filed on Aug. 12, 2009.

(30) Foreign Application Priority Data

Oct. 21, 2008  (CN) .......................... 2008 1 0167625

(51) Int. Cl.
    *H04L 12/28* (2006.01)
(52) U.S. Cl.
    USPC ............................ 370/390; 370/469; 714/746
(58) Field of Classification Search
    USPC .................................. 370/390, 469; 714/746
    See application file for complete search history.

(56) References Cited

U.S. PATENT DOCUMENTS

| | | | |
|---|---|---|---|
| 2001/0049727 A1* | 12/2001 | Mukherjee et al. | 709/219 |
| 2004/0042479 A1* | 3/2004 | Epstein et al. | 370/432 |
| 2007/0177632 A1 | 8/2007 | Oz et al. | |
| 2008/0181181 A1 | 7/2008 | Gorokhov et al. | |
| 2009/0116430 A1* | 5/2009 | Bonta et al. | 370/329 |

FOREIGN PATENT DOCUMENTS

| | | |
|---|---|---|
| CN | 1829175 A | 9/2006 |
| CN | 1949755 A | 4/2007 |
| CN | 101047938 A | 10/2007 |
| CN | 101060473 A | 10/2007 |
| CN | 101087208 A | 12/2007 |

OTHER PUBLICATIONS

Written Opinion of the International Searching Authority in corresponding International Patent Application No. PCT/CN2009/073205 (Oct. 15, 2009).

Extended European Search Report in corresponding European Patent Application No. 09821537.9 (Jun. 28, 2012).

International Search Report in corresponding PCT Application No. PCT/CN2009/073205 (Oct. 15, 2009).

(Continued)

*Primary Examiner* — Wei Zhao

(74) *Attorney, Agent, or Firm* — Leydig, Voit & Mayer, Ltd.

(57) ABSTRACT

A resource initialization method and system, and a network access server are provided. The resource initialization method includes: receiving a network access request transmitted from a User Equipment (UE), where the network access request includes: UE identity (ID) information; locally searching for, according to the UE ID information in the network access request, and find a preconfigured unicast and multicast resource threshold corresponding to the UE ID information; and transmitting the unicast and multicast resource threshold of the UE to a Resource Manager (RM), so that the RM assigns unicast resources and multicast resources according to the unicast and multicast resource threshold. Through the method, the process of obtaining the unicast and multicast resource threshold can be simplified, and thus the efficiency of resource initialization configuration is improved.

13 Claims, 3 Drawing Sheets

(56) References Cited

OTHER PUBLICATIONS

"draft ETSI RES 282 003—Telecommunications and Internet Converged Services and Protocols for Advanced Networking (TISPAN); Resource and Admission Control Sub-system (RACS); Functional Architecture; Release 2," Oct. 2007, Version 0.8.9, European Telecommunications Standards Institute, Sophia Antipolis Cedex, France.

* cited by examiner

RESOURCE INITIALIZATION METHOD AND SYSTEM, AND NETWORK ACCESS SERVER

CROSS-REFERENCE TO RELATED APPLICATIONS

This application is a continuation of International Application No. PCT/CN2009/073205, filed on Aug. 12, 2009, which claims priority to Chinese Patent Application No. 200810167625.1, filed on Oct. 21, 2008, both of which are hereby incorporated by reference in their entireties.

FIELD OF THE INVENTION

The present invention relates to the field of communication technologies, and in particular, to a resource initialization method and system, and a network access server.

BACKGROUND OF THE INVENTION

As for multicast or broadcast services, such as a Broadcast Television (BTV) service, an access network mainly relies on an Internet Group Management Protocol (IGMP) of a terminal to trigger the resource reservation of the multicast service. In view of the fast channel zapping, it is required to reduce delay as much as possible during the resource reservation process, and therefore, an entity responsible for resource admission and control in an access end is a Distributed Resource Manager (D-RM), and the RM is generally located on an Access Node (AN). As for unicast services, a mechanism that the network triggers the resource reservation is usually used. For example, a Video On Demand (VOD) server or an Internet Protocol Multimedia Subsystem (IMS) requests a Centralized-RM (C-RM), and the C-RM performs the resource reservation.

At present, a network provider determines a resource ratio of the multicast to the unicast in the access network, that is, the ratio of the resources respectively managed by the D-RM and the C-RM, and the resource ratio of the multicast to the unicast is a threshold. In the respective threshold management range of the D-RM and the C-RM, the C-RM processes the resource request of the unicast, and the D-RM processes the resource request of the multicast. In the case that the resources managed by the C-RM or the D-RM are insufficient for use, the resources may be requested from a peer RM (that is, the C-RM requests resources from D-RM, or the D-RM requests resources from C-RM) to perform the threshold adjustment, so as to achieve the purpose of sharing access resources. Since the resources used for the unicast and multicast services of different users are different, and the threshold requirements of different users are different, it is required to configure the threshold parameters on RM and AN devices before the user uses the services.

SUMMARY OF THE INVENTION

Embodiments of the present invention provide a resource initialization method and system, and a network access server, which can simplify the process of obtaining a unicast and multicast resource threshold, thus improving the efficiency of the resource initialization configuration.

An embodiment of the present invention provides a resource initialization method, where the method includes:

receiving a network access request transmitted from a User Equipment (UE), where the network access request includes: UE identity (ID) information;

locally searching for, according to the UE ID information in the network access request, and find a preconfigured unicast and multicast resource threshold corresponding to the UE ID information; and transmitting the unicast and multicast resource threshold of the UE to an RM, so that the RM assigns unicast resources and multicast resources according to the unicast and multicast resource threshold.

An embodiment of the present invention provides a network access server, where the network access server includes:

a first receiving module, configured to receive a network access request transmitted from a UE, where the network access request includes: UE ID information;

a storage module, configured to store unicast and multicast resource threshold information which is set for the UE;

an obtaining module, configured to, according to the UE ID information in the network access request, search the storage module and find a unicast and multicast resource threshold corresponding to the UE ID information; and a first transmitting module, configured to transmit the unicast and multicast resource threshold to an RM, so that the RM assigns unicast resources and multicast resources according to the unicast and multicast resource threshold.

An embodiment of the present invention provides a resource initialization system, where the system includes: a network access server and an RM, where the network access server is configured to receive a network access request transmitted from a UE, locally search for, according to the UE ID information carried in the network access request, and find a preconfigured unicast and multicast resource threshold corresponding to UE ID information, and transmit the unicast and multicast resource threshold of the UE to the RM; and the RM is configured to receive the unicast and multicast resource threshold transmitted from the network access server, and assign unicast resources and multicast resources according to the unicast and multicast resource threshold.

Compared with the conventional art, the embodiments of the present invention have the following advantages.

The unicast and multicast resource threshold of the UE is used as the user information, and is configured in the network access server. When the UE accesses the network, the user information of the UE is obtained according to the UE ID information carried in the network access request transmitted from the UE. The network access server transmits the unicast and multicast resource threshold in the user information to the RM, and the RM performs initial threshold configuration. In this way, the user information of the UE is easily obtained according to the UE ID information carried in the network access request of the UE, and the unicast and multicast resource threshold in the user information is transmitted to the resource management server. In this way, the network access server is triggered, by the action that the UE accesses the network, to transmit the unicast and multicast resource threshold, thus accelerating the process of obtaining the unicast and multicast resource threshold, and improving the efficiency of the resource initialization.

BRIEF DESCRIPTION OF THE DRAWINGS

To illustrate the technical solutions according to the embodiments of the present invention or in the conventional art more clearly, the accompanying drawings for describing the embodiments or the conventional art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Conventionally, a threshold value is configured in an RM, and when the RM performs resource initialization, a complex information interaction process is required for obtaining UE information, so as to determine a threshold to be used. Moreover, separation of the threshold from other information of the UE may cause that the threshold used for the resource initialization does not match other information of the UE, thus failing to meet the requirement of the UE, and affecting the efficiency of the resource initialization configuration.

An embodiment of the present invention provides a resource initialization method and system, and a network access server, which can simplify the process of obtaining a unicast and multicast resource threshold, thus improving the efficiency of the resource initialization configuration.

The resource initialization method and system, and the network access server according to embodiments of the present invention will be described in detail with reference to the accompanying drawings and specific embodiments.

Figure 1:
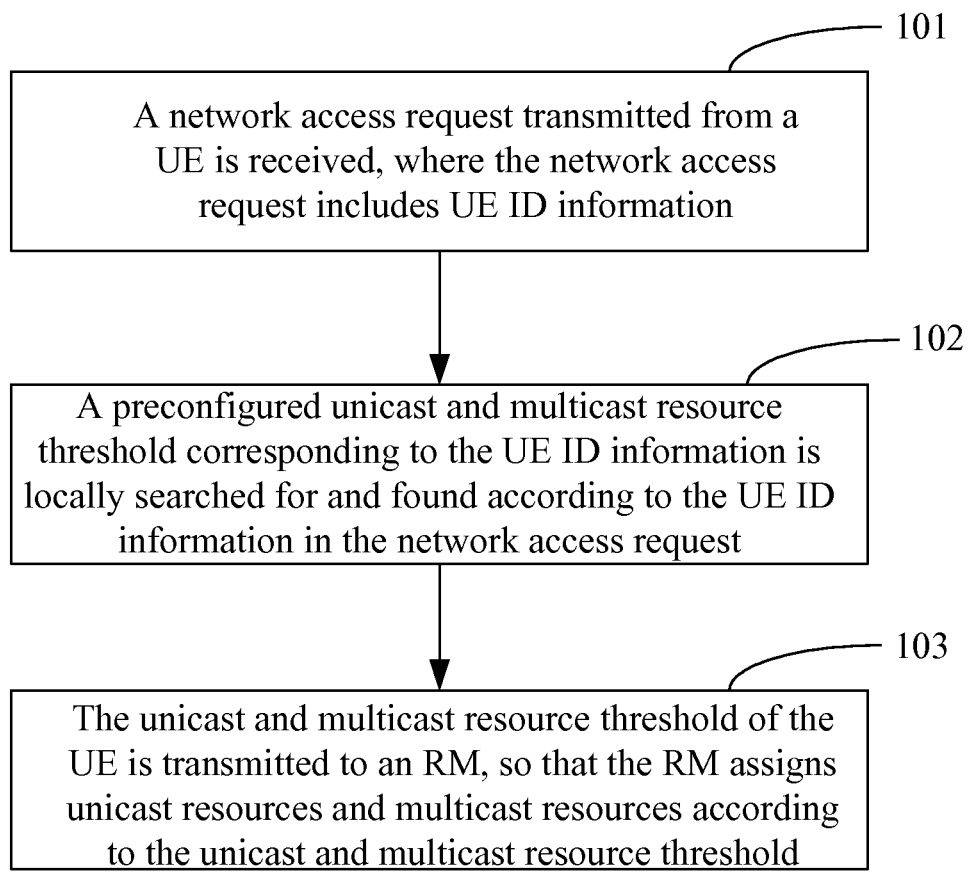
FIG. 1 is a flow chart of a resource initialization method according to an embodiment of the present invention.

FIG. 1 is a flow chart of a resource initialization method according to an embodiment of the present invention. As shown in FIG. 1, the method includes the following steps.

In step 101, a network access request transmitted from a UE is received, where the network access request includes UE ID information.

When the UE intends to get online (i.e., to access a network), the UE needs to pass authentication of a network access server. After receiving a network access request transmitted from the UE, the network access server determines, according to ID authentication information carried in the network access request, whether the UE is allowed to access the network, and if the UE is allowed to access the network, the network access server returns a response, which indicates that the authentication is passed, to the UE.

In step 102, a preconfigured unicast and multicast resource threshold corresponding to the UE ID information is locally searched for and found according to the UE ID information in the network access request.

According to the UE ID information carried in the network access request transmitted from the UE, such as any one or more of: an Internet Protocol (IP) address, a UE identifier, and location information of the UE, the identity of the UE may be recognized, and the user information of the UE may be obtained in a database of the network access server, where the user information includes the type of the UE and protocol supported by the UE in addition to the unicast and multicast resource threshold, and the unicast and multicast resource threshold belongs to the user information of the UE and is used for indicating the desired ratio of the unicast to the multicast of an access line when the UE accesses the network. It should be noted that, after the network access request of the UE is received, the UE is authenticated for access, and the preconfigured unicast and multicast resource threshold corresponding to the UE ID information is obtained locally only after the authentication is passed.

In step 103, the unicast and multicast resource threshold of the UE is transmitted to an RM, so that the RM assigns unicast resources and multicast resources according to the unicast and multicast resource threshold.

In this embodiment, the unicast and multicast resource threshold and other user information of the UE are stored together in a Network Authentication Server (NAS) for maintenance and management, the unicast and multicast resource threshold may be expressed by using a bandwidth value or a bandwidth percentage of the access line, and after receiving the unicast and multicast resource threshold, the RM performs the resource initialization configuration on the access line of the UE, transmits multicast resource authorization information to an AN, and then receives a multicast resource delegation reply transmitted from the AN.

In this embodiment of the present invention, the network access server is triggered, by using the network access request when the UE accesses the network, to transmit the unicast and multicast resource threshold of the UE to the RM, which simplifies the process of obtaining, by the RM, the unicast and multicast resource threshold of the UE, thus accelerating the resource initialization configuration.

Figure 2:
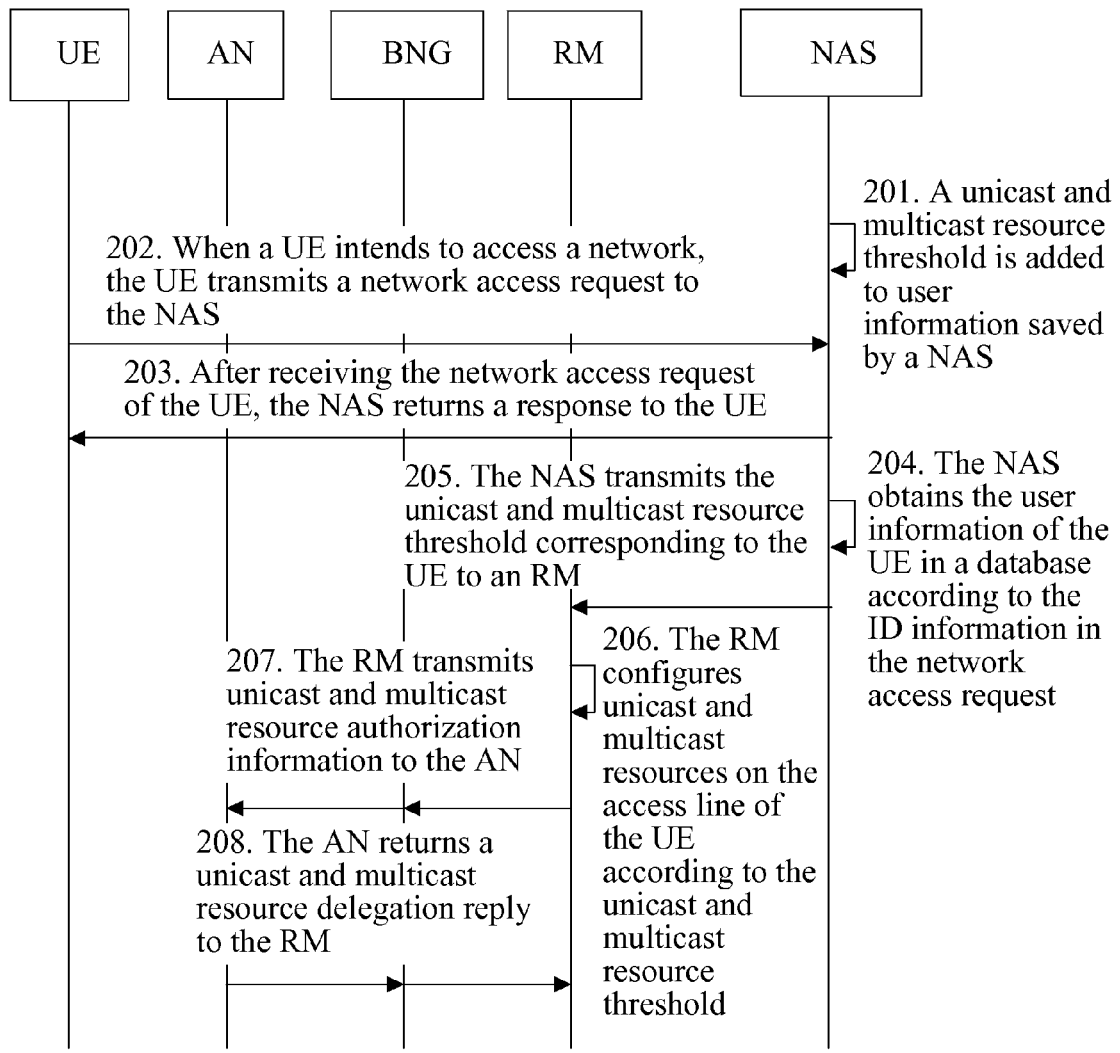
FIG. 2 is a flow chart of a resource initialization method according to another embodiment of the present invention.

A resource initialization method provided by another embodiment of the present invention will be described in detail in the following. FIG. 2 is a flow chart of a resource initialization method according to another embodiment of the present invention. As shown in FIG. 2, the method includes the following steps.

In step 201, a unicast and multicast resource threshold is added to user information saved by a NAS, where the user information is generally stored in a database of the NAS in a form of a list, and the unicast and multicast resource threshold may be added in an extension field of the list.

In step 202, when a UE intends to access a network, the UE transmits a network access request to the NAS.

In this embodiment, the UE transmits a network access request such as an ID authentication request to the NAS when accessing the network, and the network access request is transmitted to the NAS through devices such as an AN and a Broadband Network Gateway (BNG).

In step 203, after receiving the network access request of the UE, the NAS returns a response to the UE.

Specifically, the NAS determines according to the information carried in the network access request, such as an IP address, a user type, a user ID, and location information of the user, whether the UE is allowed to access the network. If the UE is allowed to access the network, the NAS returns an acknowledgment response to the UE, so that the UE may access the network according to the IP address of the UE. The response returned by the NAS is transmitted to the UE through the devices such as the AN and the BNG.

In step 204, the NAS obtains the user information of the UE in a database according to the ID information in the network access request.

In this embodiment, the UE transmitting the network access request may be determined according to the ID information of the UE, such as the IP address, a UE identifier, and the location information of the UE, and the user information corresponding to the UE is obtained in the database of the NAS, where the user information includes the unicast and multicast resource threshold.

In step 205, the NAS transmits, to an RM, the unicast and multicast resource threshold corresponding to the UE.

After obtaining the user information of the UE, the NAS transmits, to an RM, the unicast and multicast resource threshold in the user information, and the unicast and multicast resource threshold may be expressed by using a bandwidth value or a bandwidth percentage of an access line, for example, the unicast and multicast resource threshold may be expressed as unicast 1 MB.

In step 206, the RM configures unicast and multicast resources on the access line of the UE, according to the unicast and multicast resource threshold.

If the unicast and multicast resource threshold is unicast 60%, that is, the bandwidth percentage of the unicast in the access line is 60%, 60% unicast and multicast resources on the access line are assigned as unicast resources, and the residual 40% are assigned as multicast resources.

In step 207, the RM transmits unicast and multicast resource authorization information to the AN.

Specifically, the UE accesses the network through the AN, so the RM, after completing the resource configuration, transmits the unicast and multicast resource authorization information to the AN, so as to inform the AN of the resource configuration on the user access line.

In step 208, the AN returns a unicast and multicast resource delegation reply to the RM, to inform the RM of a resource configuration result, such as successful resource configuration.

The information interaction between the RM and the AN involved in step 207 and step 208 may be indirectly executed via the BNG, that is, the RM may transmit the multicast resource authorization information to the BNG, and then the BNG forwards the multicast resource authorization information to the AN.

Through the method provided by this embodiment of the present invention, the NAS is triggered, by the action that the UE accesses the network, to transmit the preconfigured unicast and multicast resource threshold to the RM, and then the RM configures the resources on the access line of the UE according to the unicast and multicast resource threshold, which simplifies the process of obtaining the unicast and multicast resource threshold, thus improving the efficiency of the resource initialization configuration.

Those of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

Figure 3:
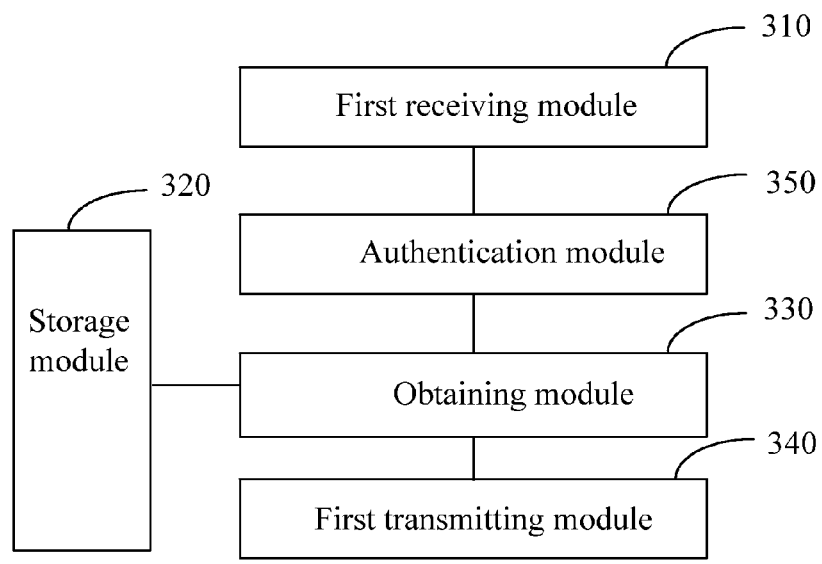
FIG. 3 is a schematic structural diagram of a network access server according to an embodiment of the present invention.

In order to implement the above method provided by embodiments of the present invention, another embodiment of the present invention further provides a network access server. FIG. 3 is a schematic structural diagram of a network access server according to an embodiment of the present invention. As shown in FIG. 3, the network access server includes a first receiving module 310, a storage module 320, an obtaining module 330 and a first transmitting module 340.

The first receiving module 310 is configured to receive a network access request transmitted from a UE, where the network access request includes UE ID information. The storage module 320 is configured to store unicast and multicast resource threshold information which is set for the UE. The obtaining module 330 is configured to, according to the UE ID information in the network access request, search the storage module 320 and find a unicast and multicast resource threshold corresponding to the UE ID information. The first transmitting module 340 is configured to transmit the unicast and multicast resource threshold to an RM, so that the RM assigns unicast resources and multicast resources according to the unicast and multicast resource threshold.

The network access server may further include an authentication module 350, configured to perform access authentication on the UE according to the UE ID information in the network access request. Only after the access authentication is passed, the obtaining module 330 obtains, according to the UE ID information and from the storage module 320, the unicast and multicast resource threshold corresponding to the UE.

The network access server provided by this embodiment of the present invention is triggered by the action that the UE accesses the network, so as to obtain the preconfigured unicast and multicast resource threshold in the user information of the UE and transmit the unicast and multicast resource threshold to the RM, so that the unicast and multicast resource threshold is used as the user information of the UE and is stored in the NAS, which simplifies the process of obtaining the unicast and multicast resource threshold, thus accelerating the resource initialization.

Figure 4:
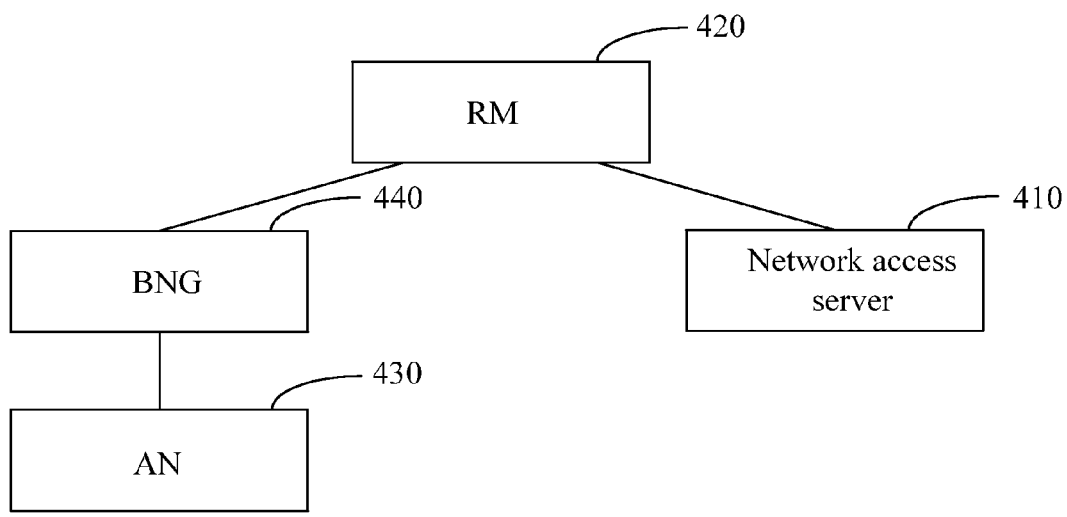
FIG. 4 is a schematic structural diagram of a resource initialization system according to an embodiment of the present invention.

An embodiment of the present invention further provides a resource initialization system. FIG. 4 is a schematic structural diagram of a resource initialization system according to an embodiment of the present invention. As shown in FIG. 4, the resource initialization system includes: a network access server 410 and an RM 420.

The network access server 410 is configured to receive a network access request transmitted from a UE, locally search for, according to the UE ID carried in the network access request, and find a preconfigured unicast and multicast resource threshold corresponding to UE ID information, and transmit the unicast and multicast resource threshold of the UE to the RM 420. The RM 420 is configured to receive the unicast and multicast resource threshold transmitted from the network access server 410, and assign unicast resources and multicast resources according to the unicast and multicast resource threshold.

The system may further include: an AN 430, configured to perform initialization configuration of unicast resources and multicast resources on a UE access line, according to unicast and multicast resource authorization information transmitted from the RM 420.

The system may further include: a BNG 440, connected to the RM 420 and the AN 430, and configured to forward the unicast and multicast resource authorization information transmitted from the RM 420 to the AN 430.

Through the method, device and system provided by the embodiments of the present invention, the unicast and multicast resource threshold is used as a user property and is stored on the NAS for maintenance together with other information, which is more suitable for the labor division of a business model, and solves the problem that no standard supports the threshold strategy delivery in the prior art, and meanwhile it neither requires an application server to participate the network initialization, nor requires the BNG to sense the network access of the user and report to the RM.

It should be understood by persons skilled in the art that the accompanying drawings are merely schematic diagrams of a preferred embodiment, and modules or processes in the accompanying drawings are not necessarily required in implementing the present invention.

It should be understood by persons skilled in the art that, modules in a device according to an embodiment may be distributed in the device of the embodiment according to the description of the embodiment, or be correspondingly changed to be disposed in one or more devices different from this embodiment. The modules of the above embodiment may be combined into one module, or further assigned into a plurality of sub-modules.

Finally, it should be noted that the above embodiments are merely provided for describing the technical solutions of the present invention, but not intended to limit the present invention. It should be understood by persons of ordinary skill in the art that although the present invention has been described in detail with reference to some exemplary embodiments, modifications or equivalent replacements can be made to the technical solutions of the present invention, and such modifications or replacements do not make the modified technical solution depart from the spirit and scope of the present invention.

What is claimed is:

1. A resource initialization method, comprising:
receiving, by a network access server, a network access request transmitted from a User Equipment (UE), wherein the network access request comprises: UE identity (ID) information;
searching for, in a database of the network access server, by the network access server, according to the UE ID information in the network access request, a pre-configured unicast and multicast resource threshold corresponding to the UE ID information, the pre-configured unicast and multicast resource threshold is used for indicating a desired ratio of unicast to multicast resources of an access line when the UE accesses a network; and
transmitting, by the network access server, the pre-configured unicast and multicast resource threshold of the UE to a Resource Manager (RM), so that the RM assigns unicast resources and multicast resources according to the desired ratio of unicast to multicast resources of the access line when the UE accesses the network indicated by the pre-configured unicast and multicast resource threshold;
wherein after the receiving the network access request, access authentication is performed for the UE, and the pre-configured unicast and multicast resource threshold corresponding to the UE ID information is obtained locally only after the access authentication is passed for the UE.

2. The method according to claim 1, wherein the desired ratio is expressed by using a bandwidth value or a bandwidth percentage.

3. The method according to claim 1, wherein the RM assigns the unicast resources and the multicast resources according to the desired ratio of unicast to multicast resources of the access line when the UE accesses the network indicated by the pre-configured unicast and multicast resource threshold comprises:
transmitting unicast and multicast resource authorization information to an Access Node (AN) accessing the UE, according to the assigned unicast resources and multicast resources.

4. The method according to claim 3, wherein the unicast and multicast resource authorization information is forwarded to the AN through a Broadband Network Gateway (BNG).

5. The method according to claim 2, wherein the RM assigns the unicast resources and the multicast resources according to the desired ratio of unicast to multicast of the access line when the UE accesses the network indicated by the pre-configured unicast and multicast resource threshold comprises:
transmitting unicast and multicast resource authorization information to an Access Node (AN) accessing the UE, according to the assigned unicast resources and multicast resources.

6. The method according to claim 5, wherein the unicast and multicast resource authorization information is forwarded to the AN through a Broadband Network Gateway (BNG).

7. The method according to claim 1, wherein the process that the RM assigns the unicast resources and the multicast resources according to the desired ratio of unicast to multicast resources of the access line when the UE accesses the network indicated by the pre-configured unicast and multicast resource threshold comprises:
transmitting unicast and multicast resource authorization information to an Access Node (AN) accessing the UE, according to the assigned unicast resources and multicast resources.

8. The method according to claim 7, wherein the unicast and multicast resource authorization information is forwarded to the AN through a Broadband Network Gateway (BNG).

9. A non-transitory computer readable medium, comprising computer-executable instructions that, when executed by a computer processor, cause the computer processor to execute the following steps:
receiving a network access request transmitted from a User Equipment (UE), wherein the network access request comprises: UE identity (ID) information;
storing unicast and multicast resource threshold information which is set for the UE;
searching a storage module, according to the UE ID information in the network access request, and finding a pre-configured unicast and multicast resource threshold corresponding to the UE ID information, the pre-configured unicast and multicast resource threshold is used for indicating a desired ratio of unicast to multicast resources of an access line when the UE accesses a network; and
transmitting the pre-configured unicast and multicast resource threshold to a Resource Manager (RM), so that the RM assigns unicast resources and multicast resources according to the desired ratio of unicast to multicast resources of the access line when the UE accesses the network indicated by the pre-configured unicast and multicast resource threshold;
wherein after receiving the network access request, access authentication is performed for the UE, and the pre-configured unicast and multicast resource threshold corresponding to the UE ID information is obtained locally only after the access authentication is passed for the UE.

10. The non-transitory computer readable medium network access server according to claim 9, wherein the steps further comprise further comprising:
an authentication module, configured to performing access authentication for the UE according to the UE ID information in the network access request, wherein only after the access authentication is passed for the UE, an obtaining module obtains, according to the UE ID information and from the storage module, the pre-configured unicast and multicast resource threshold corresponding to the UE.

11. A resource initialization system, comprising: a network access server and a Resource Manager (RM), wherein the network access server is configured to receive a network access request transmitted from a User Equipment (UE), locally search for, in a database of the network access server, according to UE identity (ID) information carried in the network access request, and find a pre-configured unicast and multicast resource threshold corresponding to the UE ID information, and transmit the pre-configured unicast and multicast resource threshold of the UE to the RM, the pre-configured unicast and multicast resource threshold is used for indicating a desired ratio of unicast to multicast resources of an access line when the UE accesses a network; and the RM is configured to receive the pre-configured unicast and multicast resource threshold transmitted from the network access server, and assign unicast resources and multicast resources according to the desired ratio of unicast to multicast resources of the access line when the UE accesses the network indicated by the pre-configured unicast and multicast resource threshold;

wherein after receiving the network access request, access authentication is performed for the UE, and the pre-configured unicast and multicast resource threshold corresponding to the UE ID information is obtained locally only after the access authentication is passed for the UE.

12. The system according to claim 11, further comprising:

an Access Node (AN), configured to perform initialization configuration of unicast resources and multicast resources on a UE access line according to unicast and multicast resource authorization information transmitted from the RM.

13. The system according to claim 12, further comprising:

a Broadband Network Gateway (BNG), connected to the RM and the AN, and configured to forward the unicast and multicast resource authorization information transmitted from the RM to the AN.

* * * * *